United States Patent [19]
Froehlking

[11] 3,895,431
[45] July 22, 1975

[54] STUD ESCAPEMENT MECHANISM
[75] Inventor: Adolf Froehlking, Willingboro, N.J.
[73] Assignee: Omark Industries, Inc., Portland, Oreg.
[22] Filed: Sept. 24, 1973
[21] Appl. No.: 399,938

Related U.S. Application Data

[63] Continuation of Ser. No. 152,759, June 14, 1971, abandoned, which is a continuation-in-part of Ser. No. 729,677, May 16, 1968, Pat. No. 3,584,727.

[52] U.S. Cl. ............................ 221/233; 239/278
[51] Int. Cl.² ....................................... B23Q 7/00
[58] Field of Search ........... 221/292, 278, 264, 268, 221/233, 171, 208

[56] References Cited
UNITED STATES PATENTS

| | | | |
|---|---|---|---|
| 3,161,274 | 12/1964 | Lanz | 221/278 UX |
| 3,266,667 | 8/1966 | MacDonald | 221/278 X |
| 3,275,191 | 9/1966 | MacDonald | 221/278 X |
| 3,339,799 | 9/1967 | Spisak | 221/278 X |
| 3,540,622 | 11/1970 | Spisak | 221/278 X |

*Primary Examiner*—M. Henson Wood, Jr.
*Assistant Examiner*—John J. Love
*Attorney, Agent, or Firm*—Charles F. Duffield

[57] ABSTRACT

An escapement mechanism for automatically feeding studs to a stud welding gun. The escapement mechanism includes a transversely movable transfer block which alternately receives studs in one position and, when transferred to the next position, pneumatically discharges the stud to the stud welding gun. A quickly removable cover plate is provided which will permit quick withdrawal and replacement of the transfer block with other blocks accommodating different size studs. The transfer block includes a camming surface to prevent the next adjacent stud from jamming the escapement on transfer to the feeding position. Additionally, the transfer block, when in the loading position, leaves the feed port unobstructed for the return and discharge of any stud from the mechanism which was not properly dispatched.

5 Claims, 3 Drawing Figures

FIG. I

INVENTOR
ADOLF FROEHLKING
BY
ATTORNEY.

STUD ESCAPEMENT MECHANISM

BACKGROUND OF THE INVENTION

This invention relates to stud welding apparatus and more particularily to a stud feeding escapement mechanism for automatically receiving and dispatching studs to a stud welding gun, and is a continuation of application Ser. No. 152,759 filed June 14, 1971 now abandoned, which is a continuation-in-part of application Ser. No. 729,677 filed May 16, 1968, now U.S. Pat. No. 3,584,727.

Today studs which are welded in what is commonly known as the stud welding technique, are more or less automatically fed and welded. The studs are maintained in a hopper and fed to an escapement mechanism which will dispatch them to the stud welding gun in a predetermined sequence. Most automatic stud welding feeding equipment today is capable of handling only one size stud. That equipment which is capable of handling mixed sizes, is very complex in its construction.

An additional problem which exists in automatic stud welding equipment is the possibility of jamming. Whenever such a mechanism does jam, it is essential that the escapement be quickly unjammed. Likewise, equipment presently available are proned to jamming and when such occurs, a rather lengthy procedure is required to disassemble the mechanism to relieve the jamming.

OBJECTS AND SUMMARY OF INVENTION

It is an object of the present invention to relieve the problems of prior stud feeding mechanisms by providing an escapement mechanism of simple and effective construction.

It is a further object of the present invention to provide an escapement mechanism for feeding studs which can be quickly and easily converted for use with different sizes of studs and also of a construction which reduces jamming and which can be easily unjammed in the event such occurs.

The present invention carries out the foregoing objects by providing an escapement mechanism which employs a stud transfer block transversely movable within a guide channel. The transfer block includes a stud receptacle therein which alternately registers with feed and discharge ports of a cover plate which covers the channel. The studs to be fed are deposited, one at a time, into the stud receptacle in the transfer block when in its feed position. The transfer block is moved to the discharge port at which the studs are pneumatically discharged from the mechanism on the same side as received but in an opposite direction.

The transfer block is moved between its respective positions by a pneumatic cylinder which is mounted adjacent to and operates on a axis parallel with the transverse movement of the transfer block. A connecting pin innerconnects the transfer block and the pneumatic piston through an elongated slot in a common wall of the channel. The transfer block includes an elongate vertical slot which engages the connecting pin and which permits the transfer block to be easily and quickly removed from the channel and out of engagement with the driving pin.

The cover plate of the channel is detachably secured by a quick detachment means. This permits the cover plate to be quickly removed and transfer blocks of different stud receptable sizes exchanged.

The transfer block includes a bevel adjacent the stud receptacle therein which will cam the adjacent next to the fed stud at the loading port out of interfering engagement with the transfer block as it transfers from the loading position to the feeding position. Additionally, the end of the guide channel adjacent the discharge port is open which will permit any partially discharged studs, which will attempt return to the escapement mechanism, to fall into the channel and be pushed out of the open end thereof to avoid jamming. In the event of a jam, the cover plate can be quickly removed to correct the problem.

Other objects and advantages of the present invention will become apparent from the following detailed description of a preferred embodiment thereof taken in reference to the accompanying drawings.

DETAILED DESCRIPTION OF INVENTION

Figure 1:
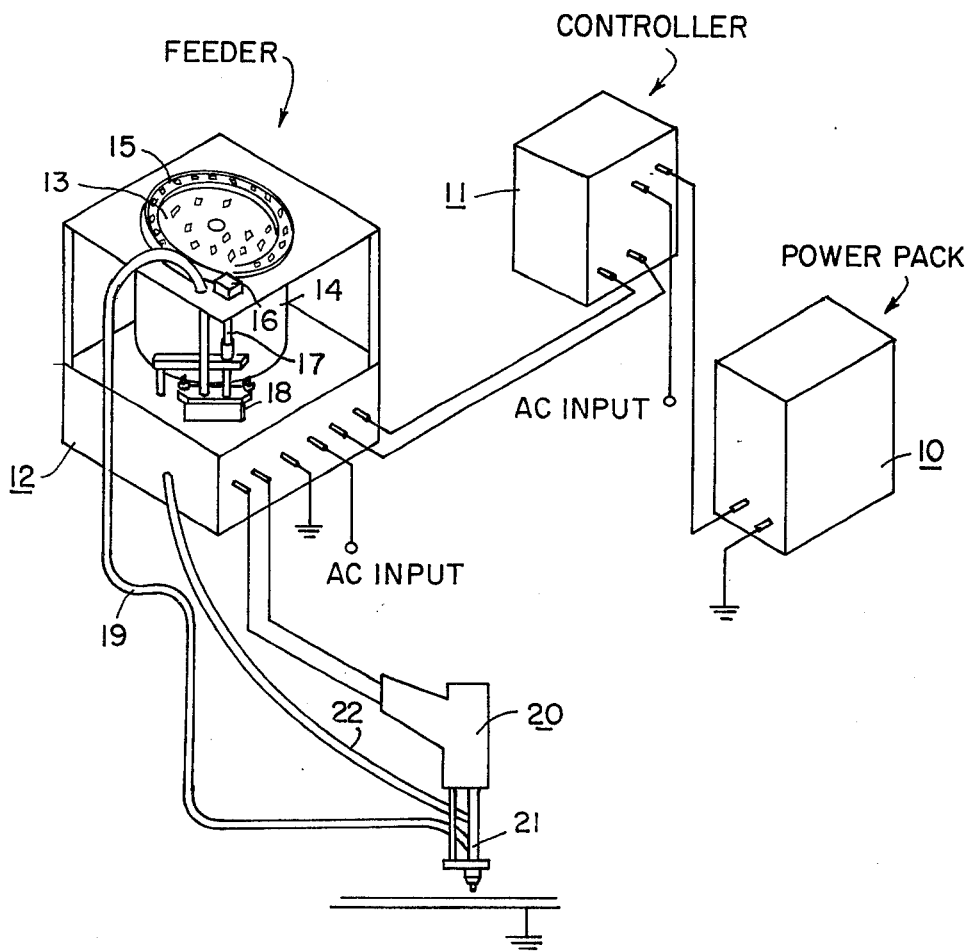
FIG. 1 is a schematic view, partly in perspective and partly in elevation of a complete welding system in which the present invention is employed.

Referring to the drawings and particularly FIG. 1, there is shown the over all apparatus or system in which the present invention is used. In the overall system, a power supply 10 is provided which in turn provides the welding energy for the welding process. This power supply may be one of many kinds, i.e., stored energy, rectified AC power input or battery powered.

The welding power from the power pack 10 is passed into a controller 11. The controller 11, through the feeding apparatus 12, serves to control the energy from the power pack 10 by selectively turning on and off the welding current as required.

The feeding mechanism 12, in which the present invention is embodied, is here shown as one of the vibratory type. In a feeder of this type, a plurality of studs are deposited in a general depository or bowl 13. By means of a rotating or operating magnetic field generated in a lower housing 14 of the feeder, moving mechanical waves are established in the rotating direction in the bowl 13. These mechanical waves operate to physically move the studs from the center of the bowl outwardly toward the circumference thereof and up an incline ramp 15 on the outer circumference of the bowl.

As the studs are moved up the ramp, they are generally aligned in an end to end configuration. However, their end to end alignment is not in respect to any particular end of the stud.

The studs, upon passing up the inclined ramp, are delivered to an orientation mechanism 16, from which they passed on through a supply and loading tube 17 to enter the escapement mechanism 18 of the present invention.

Upon the studs reaching the escapement mechanism 18, they are pneumatically delivered through a feed line 19 to the welding gun 20 where they are appropriately inserted into the chuck of the gun by means of an air cylinder 21 which is pneumatically operated by an air supply line 22.

Figure 2:
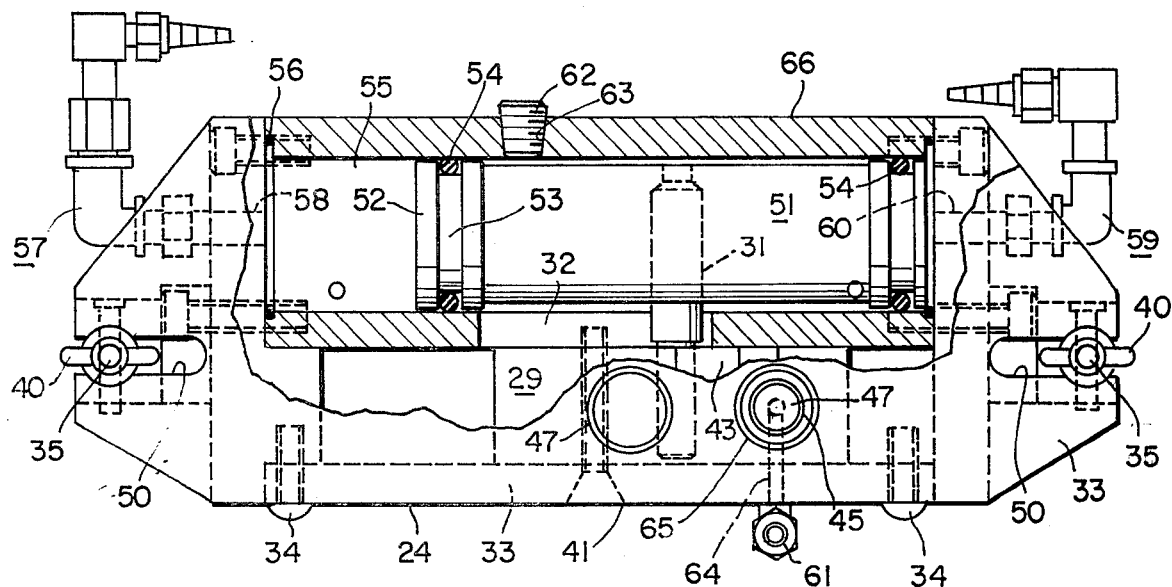
FIG. 2 is a side elevation partially in section of the escapement mechanism of the present invention.
Figure 3:
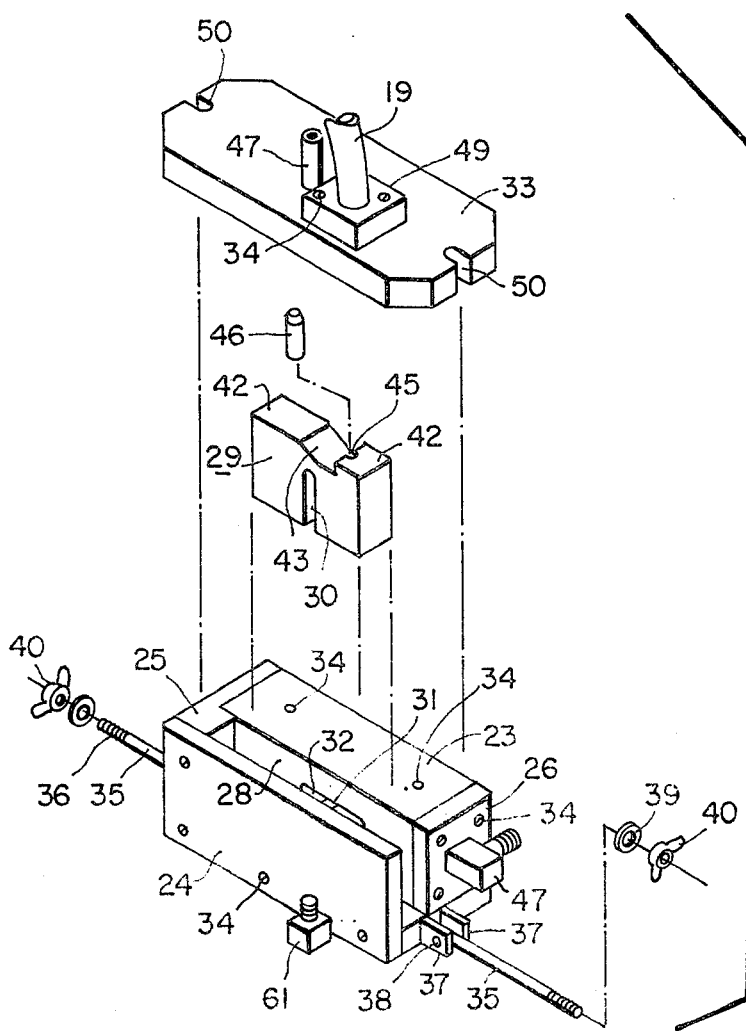
FIG. 3 is an exploded perspective view of the escapement mechanism of the presesnt invention.

The escapement mechanism of the present invention is more specifically shown in FIGS. 2 and 3 of the drawings. As more clearly shown in FIG. 3, the body of the escapement mechanism is made up of a plurality of flat plates. Two parallel side plates 24, 28, and their associated bottom plate 41 define a channel within which the transfer block 42 operates. Adjacent the channel is a cylinder formed by a common side wall 28, bottom plate 41, top plate 23 and opposite side plate 66, the latter side plate being best shown in FIG. 2. End plates 25 and 26 enclose the cylinder and the end plate 25 also doubles as the enclosure for one end of the channel. A plurality of machine screws 34 hold the plates together to form the assembly.

The transfer block 29, best shown in FIG. 3, is of a width slightly less than the width of the channel and is designed to move transversely within the channel. Likewise the height of the block is such that, when it is resting against the bottom plate 34, the top of the block will be just at the level of the top of the side plates 24 and 28.

The transfer block includes a vertical elongate groove 30 therein. This groove co-operates with a connecting pin 31 which innerconnects the transfer block 29 and piston 51 which operates within the cylinder. As best shown in FIG. 2, the connecting pin passes through an elongate slot 32 in the common side wall 28 of the mechanism. The elongate slot 32 is of length sufficient to permit the piston to move between its extreme limits of travel in either direction.

The piston assembly in the escapement mechanism is best shown in FIG. 2. The piston 51 includes a piston head 52 on either end of the piston. Each piston head includes annular groove 53 therein and a rubber O ring 54 within the groove to provide the proper air sealing means for either end of the piston within the cylinder 55.

Either end of the cylinder is sealed at the juncture of the walls of the cylinder and end thereof by means of a sealing O ring 56.

The pneumatic air pressure is applied to either end of the piston through ports 58 and 60. Cooperating with port 58 is a fitting assembly 57 threaded into the end plate 28 at the port. In a like manner, a fitting assembly 59 is threaded into the port 60 in end plate 26. Air pressure applied at either end of the cylinder will force the piston in the opposite direction. The valving assembly (not shown) which selectively applies the pneumatic pressure to either end of the piston is so designed that the air pressure will be applied at the proper end in respect to the position of the piston at that time. The valving will vent the opposite port to atmosphere to permit the piston to move freely toward the port.

A pipe plug 62 is threaded into a drilled passageway 63 in side plate 66 to aid in removal of the connecting pin 31. The pipe pluge is removed and the piston 51 moved into registry with the opening 63. At that time, the side plate 24 is removed and an elongate pin is inserted into the hole 63 to push the connecting pin 31 out of the piston 51.

Returning to FIG. 3, once the transfer block 42 is in place upon the connecting pin 31, a cover plate 33 is positioned in place over of the channel. Suitable dow pins and holes (not shown) are used to position and locate the cover plate 33 in proper position on the body of the escapement mechanism. The cover plate is held securely in place by means of a quick detachment locking assembly. The locking assembly includes elongate bolts 35 threaded at one end 36 and secured to the body of the escapement mechanism by means of a pin 38 disposed in lugs 37 and passing through an end aperture in the opposite end of bolt 35. Such an assembly is positioned at either end of the body of the escapement mechanism. Elongate grooves 50 at either end of the cover plate receive the bolts 35 when the cover plate is in place. A suitable washer 39 and wing-nut 40 are then threaded over the free end 36 of the lock bolts and threaded firmly down to secure the cover plate in place.

During operation, the controller will sequence the valving to move the piston 51 to the far left to its loading position. At this time, a plurality of studs stacked in end to end relationship will be present at loading tube 47. The loading tube 47 will then come into registry with a loading aperture 45 in the transfer block 29. As this registry occurs, a stud 46 will be deposited into the loading aperture 45.

The aperture 45 will be of diameter and height to accommodate the particular stud being loaded at that time. The upper end of the stud will extend just slightly below the top 42 of the transfer block 29. At this position, the next to be fed stud will be resting on top of the stud already in the aperture 45.

As the feeding cycle proceeds, the controller will reverse the valving sequence and the piston 51 will be driven to the right toward the discharge position. As the transfer block 29 moves to the right, a cam surface 43, which slopes downwardly through a flat 44 in the transfer block, will cam the next to be loaded stud upwardly out of engagement with the transfer block 29 thus preventing jamming of the transfer block.

When the piston 51 has reached its limit of its travel to the right, the stud aperture 45 will be in registry with a discharge port 49 in the cover plate 33. The discharge port is held in place by suitable fastening means 34 which also secure the discharge tube 19 which leads to the stud welding gun.

The controller, at this point, will sequence the valving so as to apply air pressure through a fitting 61 which is threaded into the side plate 24. A passageway extends from fitting 61 through the side plate and through the bottom plate 34 via horizontal passageway 64 and vertical passageway 65 to a position immediately under the stud aperture 45. A drilled passageway 66 through the bottom of the transfer block 29 communicates with the passageway 65 in bottom plate 34. The air pressure forces the stud 46 from the aperture into the discharge port 49 and along the feed 19 to the stud welding gun.

The sequence is now repeated and the valving is switched so as to drive the piston 51 again to the left to the loading position. On occassion, a stud which has been discharged from the mechanism will not pass completely through the discharge tube 19. When this occurs, it is likely that the stud will fall back through the tube 19 to the escapement mechanism. The length of the transfer block 29 is so adjusted that when the transfer block is in its extreme left position at which it is loading another stud, the block will have completely cleared the discharge port. In this position, any stud which has returned to the escapement, will pass through the discharge port 49 and fall into the channel. The channel at this end is open. Accordingly, as the transfer block 49 moves toward the right into the next discharge or feeding sequence, the stud which has fallen into the channel will be simply pushed out of the open end and fall away from the escapement mechanism. In this manner, improperly discharged studs will not cause jamming of the mechanism.

Different sizes of studs can be utilized with the escapement mechanism by employing different transfer blocks 29 which have stud aperture 45 therein suitably dimensioned for the different studs desired to be used. To convert the escapement from one size stud to another, all that need be done is unlock the cover plate 33 by loosening the latching mechanism and withdrawal the transfer block 29 from the channel and insert the new transfer block for the particular stud desired. The cover plate can be quickly reassembled to the mechanism. The same quick disassembly of the cover plate 33 also permits quick unjamming of the mechanism should such occur.

The loading tube 47 and discharge tube 19 are secured in the cover 33 by a suitable friction means (not shown). Such means could include an O ring disposed in an annular groove in the cover plate 33. The O ring will hold the particular loading or discharge tube in place when the tube is pressed into place in the cover plate 33.

From the foregoing, it will be appreciated that the escapement mechanism of the present invention is one which employs a unique construction in receiving and discharging the studs upon the same side but in opposite directions. Additionally, the escapement mechanism is one which employs a cam on the transfer block and an open end in the channel to avoid jamming of the mechanism. Additionally, the quickly removable cover provides easy inspection and exchange of transfer blocks for use with different sizes of studs.

Various modifications of the present invention will be apparent to those skilled in the art, and it is understood that such modifications can be made without departing from the scope of the invention.

I claim:

1. In stud welding apparatus, an escapement mechanism for receiving a stud from an orientation mechanism and dispatching the stud to a welding gun for welding comprising:
   a channel formed by parallel side walls and an interposed bottom wall;
   a stud transfer block having a stud receptacle therein disposed within said channel for transverse movement therealong;
   a cover plate for said channel having stud feeding and discharge ports therein in registery with said channel;
   fluid operated means interconnected with said stud transfer block for moving the transfer block alternately into and out of registry with said loading and discharge ports in the cover plate, and
   quick detachable means interconnecting said cover plate to the channel and maintaining the same in proper position whereby the cover plate can be quickly removed to replace the transfer block to accommodate studs of different lengths.

2. The escapement mechanism of claim 1 wherein the fluid operated means is a pneumatic cylinder and piston disposed adjacent said channel and operating along an axis parallel therewith and further including a connecting pin journaled within the piston and transfer block and operating through a slot in one of the walls of the channel.

3. The escapement mechanism of claim 2 wherein the transfer block includes a vertical elonagte slot therein which cooperates with the connecting pin and which permits the transfer block to be quickly removed from the assembly by vertical withdrawal from the channel whenever the cover plate of the escapement mechanism has been removed.

4. In welding apparatus, an escapement mechanism for receiving a stud from an orientation mechanism and dispatching the stud to a welding gun for welding comprising;
   a stud loading port through which studs are adapted to pass by gravity;
   a welding gun feed port disposed adjacent said loading port through which studs are dispatched to the welding gun;
   a stud transfer block having a stud receptacle therein;
   transfer block actuating means for alternately registering said stud receptacle with said loading port to receive a stud therein by means of gravity and to register said stud receptacle with said feed port while closing off said loading port for transfer of said stud through said feed port to the welding gun; and
   means including an external passageway adjacent the feed port and in open communication with the feed port whenever the transfer block is in the loading position permitting any stud not entirely dispatched to the welding gun to return, in a reverse direction, to the feed port and to be ejected through the passageway externally of the mechanism without causing jamming thereof.

5. In stud welding apparatus, an escapement mechanism for receiving a stud from an orientation mechanism and dispatching the stud to a welding gun for welding comprising:
   a channel formed by parallel side walls and an interposed bottom wall;
   a stud transfer block having a stud receptacle therein disposed within said channel for transverse movement therealong;
   a cover plate for said channel having stud feeding and discharge ports therein in registry with said channel;
   operating means including a connecting pin interconnected with the stud transfer block for moving the transfer block alternately into and out of registry with the loading and discharge ports in the cover plate; and
   connecting means including a vertical elongate slot in the transfer block interconnecting the transfer block and connecting pin to permit vertical withdrawal of the transfer block from the channel of the escapement mechanism whenever the cover plate has been removed.

* * * * *